(12) United States Patent
Hsu et al.

(10) Patent No.: US 6,471,922 B1
(45) Date of Patent: *Oct. 29, 2002

(54) ACTINIDE REMOVAL FROM SPENT SALTS

(75) Inventors: Peter C. Hsu, Pleasanton; Erica H. von Holtz, Livermore; David L. Hipple, Livermore; Leslie J. Summers, Livermore; Martyn G. Adamson, Danville, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/259,784

(22) Filed: Mar. 1, 1999

(51) Int. Cl.$^7$ .............................................. C01G 56/00
(52) U.S. Cl. ................................ 423/11; 423/3; 423/6; 588/10
(58) Field of Search ........................... 423/11, 3, 6, 12; 588/10

(56) References Cited

U.S. PATENT DOCUMENTS

| | | | |
|---|---|---|---|
| 3,288,570 A | * 11/1966 | Henrickson | |
| 4,436,704 A | * 3/1984 | Krennrich et al. | 423/11 |
| 4,675,166 A | * 6/1987 | Joubert | 423/11 |
| 4,879,006 A | * 11/1989 | Turner | 423/6 |
| 4,954,293 A | * 9/1990 | Cailly et al. | 423/3 |
| 4,968,504 A | * 11/1990 | Rourke | 423/11 |
| 5,656,009 A | * 8/1997 | Feng et al. | 588/10 |

OTHER PUBLICATIONS

Removal of Uranium from Spent Salt from the Molten Salt Oxidation Process, Leslie Summers et al., UCR-L-ID-126857, Mar. 1997 (Published Oct. 1997), Lawrence Livermore National Laboratory, pp. 1–11.

* cited by examiner

Primary Examiner—Steven P. Griffin
Assistant Examiner—Christina Ildebrando
(74) Attorney, Agent, or Firm—Alan H. Thompson; Ann M. Lee

(57) ABSTRACT

A method for removing actinide contaminants (uranium and thorium) from the spent salt of a molten salt oxidation (MSO) reactor is described. Spent salt is removed from the reactor and analyzed to determine the contaminants present and the carbonate concentration. The salt is dissolved in water, and one or more reagents are added to precipitate the thorium as thorium oxide and/or the uranium as either uranium oxide or as a diuranate salt. The precipitated materials are filtered, dried and packaged for disposal as radioactive waste. About 90% of the thorium and/or uranium present is removed by filtration. After filtration, salt solutions having a carbonate concentration >20% can be dried and returned to the reactor for re-use. Salt solutions containing a carbonate concentration <20% require further clean-up using an ion exchange column, which yields salt solutions that contain less than 0.1 ppm of thorium or uranium.

17 Claims, 2 Drawing Sheets

ACTINIDE REMOVAL FROM SPENT SALTS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the removal of actinides from spent salt generated from a molten salt oxidation reactor. In particular, this method removes uranium and thorium from spent salt to facilitate recycling of the salt for reuse in the reactor or disposal of the salt as non-hazardous waste.

2. Description of Related Art

Molten salt oxidation (MSO) is a thermal process that is capable of destroying organic constituents of energetic materials, hazardous wastes, and mixed wastes (i.e., wastes containing both organic and radioactive materials). In this process, combustible waste and air are introduced into a bath of molten carbonate salt (typically sodium carbonate), where the organic constituents of the waste materials are oxidized to carbon dioxide, nitrogen, and water. Inorganic products resulting from the reaction of the molten salt with the halogens, sulfur, phosphorous, metals, and radionuclides introduced into the salt bath must be removed to prevent the excessive build-up of inorganic products in the sodium carbonate. The excess build-up of these products in the carbonate salt would result in a dramatic drop in the efficiency of the system and would greatly increase the amount of toxic off-gases produced.

The carbonate salt serves both as a chemical reagent and as an acid scrubber to neutralize any acidic by-products produced during the waste destruction process. As the carbonate content in the salt decreases, the efficiency of the process decreases. At a certain point, the salt is removed from the reactor and the hazardous constituents are separated from the salt.

Because many of the metals and radionuclides captured in the salt are hazardous, the spent salt removed from the reactor would create a large secondary waste stream without further treatment. Thus, there is a need for a spent salt clean-up and recovery system to segregate these materials and minimize the amount of secondary waste. Once the hazardous constituents have been isolated, they can then be encapsulated for final disposal. This invention describes a separation strategy developed for actinide removal from mixed spent salt.

SUMMARY OF THE INVENTION

The present invention is a method for removing actinide contaminants from the spent salt of a molten salt oxidation (MSO) reactor. Removal of these contaminants enables the secondary waste stream generated by the MSO operation to be kept at a minimum. Once the contaminants are removed, the spent salt may either be re-used in the MSO process or disposed of as non-hazardous waste. If the salt still contains a high amount of carbonate (greater than about 20% by weight), it will be recycled into the MSO reactor. If the salt contains a low amount of carbonate (less than about 20% by weight), it no longer serves a useful purpose in the MSO process and will therefore be disposed of. Although this invention may be applied to other actinides, the processes for removing uranium and thorium from MSO spent salt will be emphasized. (Actinides are defined as elements 89–103 of the periodic table.)

To begin removal of the contaminants, the spent salt is cooled to ambient temperature, removed from the reactor, ground up, analyzed, and dissolved in water. If thorium is present, the clean-up procedure followed is not dependent on the pH of the dissolved salt solution or the concentration of carbonate present. An alkali hydroxide such as sodium hydroxide is added to the salt solution, causing the thorium present to form the insoluble precipitate thorium oxide ($ThO_2$). If uranium is also present and the salt contains more than about 20% carbonate, then the uranium will also precipitate as an alkali diuranate. The solution is filtered and yields an actinide contaminated filter cake that is dried and packaged for disposal as radioactive waste. Alternatively, the cake can be mixed with ceramic powder to form stabilized pellets after calcination and sintering.

If uranium is present and the salt contains less than about 20% carbonate, then the uranium exists in the hexavalent uranyl state and forms the uranyl tricarbonate complex $[UO_2(CO_3)_3]^{-4}$. Any thorium must first be removed by the process described above. The remaining solution must then be neutralized by the addition of acid (e.g., HCl) to facilitate the removal of uranium. A reducing agent, such as an alkali sulfide or an alkali dithionite, is added to reduce the oxidation state of the uranium from U(VI) to U(IV). Once the oxidation state is reduced, uranium precipitates as uranium oxide ($UO_2$), which is filtered and disposed of as radioactive waste.

Generally, the precipitation and filtration steps remove about 90% of the thorium and/or uranium that is present in the original spent salt solution. The filtered salt solution is treated differently depending on whether the salt is to be disposed of or reused. If the salt is destined for re-use, it is merely dried using a spray dryer and returned to the MSO reactor. If the salt is to be disposed of, a further clean-up step is necessary. The additional clean-up is accomplished by sending the solution through a commercially available ion exchange column (such as Diphonix™), which yields salt solutions that contain less than 0.1 ppm thorium and/or uranium.

BRIEF DESCRIPTION OF THE DRAWINGS

The accompanying drawings, which are incorporated into and form part of this disclosure, illustrate embodiments of the invention and together with the description, serve to explain the principles of the invention.

DETAILED DESCRIPTION OF THE INVENTION

The present invention is a method for removing actinides from the spent salt of an MSO reactor. As the MSO system operates, inorganic products resulting from the reaction of halogens, sulfur, phosphorous, metals, and actinides with carbonate accumulate in the salt bath. Several pathways are described to treat the spent salt, depending on both the composition of the salt and the hazardous materials contained within it. Although the invention may be applied to actinides in general, thorium and uranium are of particular interest and will be discussed in detail. There are two operational modes for salt removal: (1) during reactor operation, a slip-stream of molten salt is continuously withdrawn with continuous replacement by carbonate, or (2) the spent salt melt is discharged completely and the reactor then refilled with carbonate in batch mode. The present invention focuses on the batch mode process.

Figure 1:
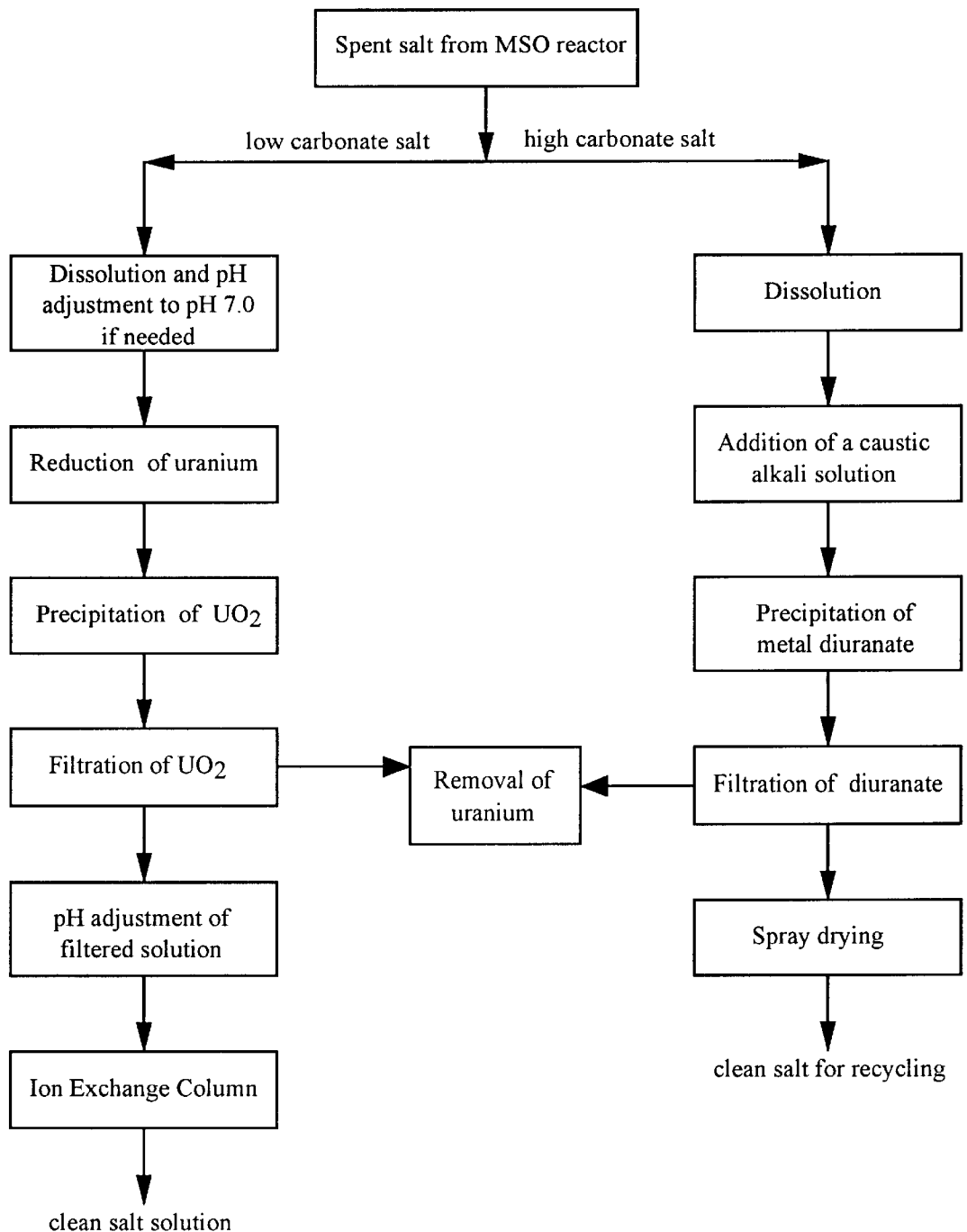
FIG. 1 is a process flow chart for uranium removal from spent salt.

FIG. 1 shows the process for removing uranium from spent salt. The spent salt is first withdrawn from the MSO reactor and cooled to ambient temperature. To facilitate easy dissolution into water, the salt is ground into small particles generally no larger than about 7 mm using a commercial grinder.

After the size reduction, the clean-up method chosen is dependent on the concentration of carbonate in the salt. When the concentration of carbonate in the spent salt is low, typically below 20% carbonate (by weight), the salt's final destination is disposal and the low carbonate pathway is followed, as shown in FIG. 1. Spent salt having more than 20% carbonate (by weight) is usually recycled, and the high carbonate pathway is followed.

The low carbonate pathway proceeds as follows. Once a batch of spent salt has been removed from the reactor and cooled to ambient temperature, water is added until all of the salt is dissolved. At this point, the pH of the solution must be neutral (7) and can be adjusted by the addition of acid (e.g., HCl) if necessary. The neutralization of the salt solution allows reduction of the uranium. In the presence of carbonate, uranium exists in the hexavalent uranyl state and forms the uranyl tricarbonate complex $[UO_2(CO_3)_3]^{-4}$. A reducing agent such as sodium dithionite is added to reduce the oxidation state of the uranium from +6 to +4. Once U(VI) is reduced to U(IV), the uranium ions react with the oxygen in the solution to form an insoluble precipitate of uranium oxide ($UO_2$). The following equation describes the reaction with uranium when sodium dithionite is added:

$$S_2O_4^{-2} + 3UO_2(CO_3)_3^{-4} + 8OH^- \leftrightarrows 9CO_3^{-2} + 2SO_4^{-2} + 3UO_2\downarrow + 4H_2O.$$

Waste streams often contain chromium as well as uranium. Sodium dithionite is typically the reducing agent chosen because it is also effective at lowering the oxidation state of chromium from a soluble state of +6 to an insoluble state of +3. Use of sodium dithionite enables chromium to be removed by precipitation at the same time as uranium.

The precipitated materials are captured by continuously pumping the solution through a small membrane filter, such as a one micron pore size polypropylene filter. The pumping is continued until the solution becomes clear. At this stage in the process, any solid particles such as ash or silica will also adhere to the filter and are removed along with the uranium oxide that is recovered. The filtration yields uranium oxide, which can be packaged and disposed of as radioactive waste or immobilized as ceramic pellets.

The pH of the filtered solution is then adjusted to an optimum pH with an appropriate amount of acid (e.g., HCl). The filtered solution is pumped several times through a column of ion exchange resin for further uranium removal. The desired pH is dependent on the type of ion exchange resin chosen. Diphonix™, a commercial ion exchange resin, was found to work for this application and is most effective at a pH of 5.5. This final step yields a solution containing less than about 0.1 ppm of uranium. The clean aqueous salt solution can then be discarded as non-hazardous waste, and the ion exchange resin can be destroyed in the MSO reactor. Over 90% (by weight) of the uranium in the solution precipitates as uranium oxide upon addition of the reducing agent. After the ion exchange process, the uranium removal exceeds 99%.

When the concentration of carbonate in the spent salt containing uranium is greater than 20%, the high carbonate pathway is followed, as shown in FIG. 1. After clean-up, the salt is returned to the MSO reactor for re-use. As before, a batch of salt is removed from the reactor, cooled to ambient temperature, and ground into particles. The salt is then completely dissolved in water. Because carbonate and oxygen are present in the salt solution, the uranium is forced into the hexavalent (uranyl) state forming the uranyl tricarbonate complex:

$$UO_2^{++} + 3\ CO_3^{-2} \rightarrow [UO_2(CO_3)_3]^{-4}.$$

The solution will typically be at a pH of about 10–12. Under these conditions, many elements are precipitated as hydroxides or carbonates while uranium remains in solution as the highly soluble sodium uranyl tricarbonate complex. Precipitation of uranium is accomplished by the addition of a strong, caustic alkali hydroxide such as sodium hydroxide. When the hydroxyl ion concentration becomes great enough (pH>12.5), or there is an excess of sodium hydroxide of about five grams per liter, the uranium tricarbonate complexes break up and sodium diuranate will precipitate according to the following equation:

$$2\ UO_2(CO_3)_3^{4-} + 6\ OH^- + 2\ Na^+ \leftrightarrows Na_2U_2O_7\downarrow + 6\ CO_3^{-2} + 3\ H_2O.$$

The precipitated material (diuranate) is captured by continuously pumping the solution through a filter, such as a one micron pore size polypropylene filter, until the solution becomes clear. At this stage in the process, any solid particles such as ash or silica will also adhere to the filter and be removed along with the sodium diuranate that is recovered. The solid sodium diuranate accounts for about 90% of the uranium that was present in the original spent salt. Now isolated, it can be packaged and disposed of as radioactive waste or immobilized as ceramic pellets. No further clean-up of the salt solution is necessary in this case. The filtered solution can be dried using a spray dryer, and the clean salt is then returned to the MSO reactor for re-use.

Figure 2:
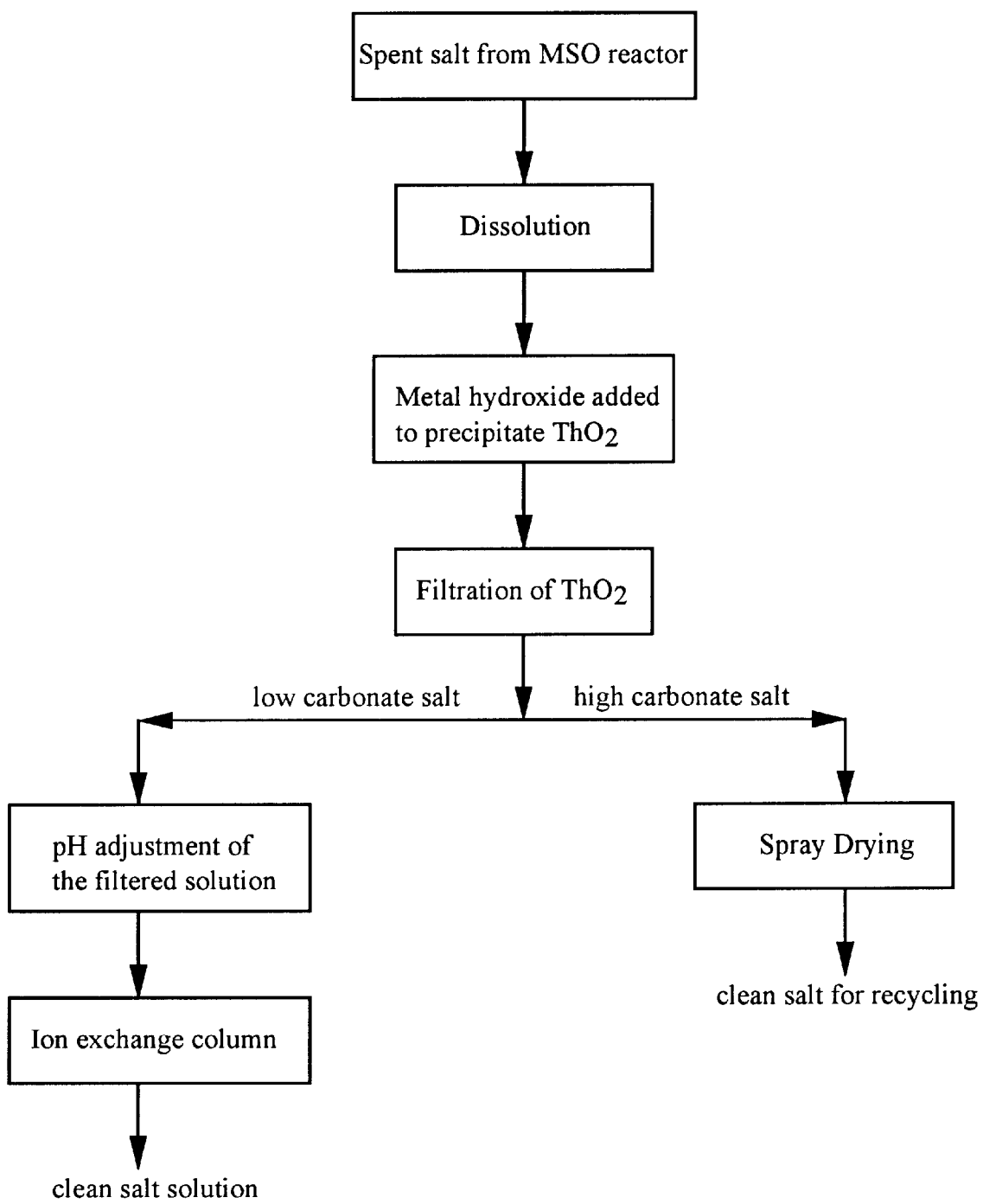
FIG. 2 is a process flow chart for thorium removal from spent salt.

FIG. 2 shows the inventive process for removing thorium from spent salt. A separate process from the uranium removal process was required because of the differences in thorium chemistry. The first steps to isolate thorium oxide are independent of the carbonate concentration in the salt. After the majority of the thorium has been removed, the carbonate concentration determines whether the salt will be recycled or disposed of. In all cases, the spent salt is first withdrawn from the MSO reactor and cooled to ambient temperature. The salt is then ground into small particles generally no larger than about 7 mm using a commercial grinder to facilitate easy dissolution into water. A metal hydroxide (e.g., sodium hydroxide) is added, which forces the thorium in solution to precipitate as $ThO_2$ according to the following equation:

$$12\ OH^- + 3\ Th^{+4} \leftrightarrows 3\ ThO_2 + 6\ H_2O.$$

The precipitated material ($ThO_2$) is captured by continuously pumping the solution through a filter, such as a one micron pore size polypropylene filter, until the solution becomes clear. At this stage in the process, any solid particles such as ash or silica will also adhere to the filter and be removed along with the thorium oxide that is recovered. The filtration yields thorium oxide, which can be packaged and disposed of as radioactive waste or immobilized as ceramic pellets. Ninety percent of the thorium (by weight) is removed during filtration.

If the salt has low carbonate content, it is typically destined for disposal, and the pH of the filtered solution is adjusted to an optimum pH with an appropriate amount of acid (e.g., HCl). The filtered solution is pumped several times through a column of ion exchange resin for further thorium removal. The desired pH is dependent on the type of ion exchange resin chosen. Diphonix™, a commercial ion exchange resin, was found to work for this application and is effective at a pH of 5.5. This procedure yields a solution containing less than about 0.1 ppm of thorium. The clean aqueous salt solution can then be discarded as non-hazardous waste, and the ion exchange resin can be destroyed in the MSO reactor.

Salt containing more than 20% carbonate salt is usually recycled. After the bulk of the thorium is removed by filtration, the filtered salt solution can simply be spray dried and returned to the MSO reactor for re-use.

In cases where both uranium and thorium are present, treatment again varies based on the carbonate concentration of the salt. If the carbonate concentration is high (greater than 20%), then the process for uranium removal (FIG. 1) is followed, and the thorium precipitates out as $ThO_2$ at the same time as the metal diuranate. If the carbonate concentration is low (less than 20%), then the thorium must be removed first. The process in FIG. 2 is followed until the step where the solution is filtered for $ThO_2$. At that point, the low carbonate pathway in FIG. 1 (i.e., beginning with the pH adjustment to 7.0) is then followed to completion.

The foregoing description of preferred embodiments of the invention is presented for purposes of illustration and description and is not intended to be exhaustive or to limit the invention to the precise form disclosed. Many modifications and variations are possible in light of the above teaching.

What is claimed is:

1. A method for removing actinides from a spent salt of a molten salt reactor, comprising:
   dissolving the salt in water to form a salt solution;
   precipitating out the actinides to form a first precipitate by adding a first reducing agent including a metal hydroxide to the salt solution;
   removing the first precipitate from the salt solution to form an initial filtered salt solution;
   precipitating out a second precipitate of the actinides by adding a second reducing agent to the initial filtered salt solution; and
   removing the second precipitate from the initial filtered salt solution to form a final filtered salt solution.

2. The method as recited in claim 1, further comprising passing the final filtered salt solution through an ion exchange column after removing the second precipitate to further remove actinides remaining in the final filtered salt solution.

3. The method as recited in claim 2, wherein the final filtered salt solution has an actinide concentration less than about 0.1 ppm after passing through the ion exchange column.

4. The method as recited in claim 1, wherein the spent salt includes a carbonate, further comprising determining the carbonate concentration of the spent salt.

5. The method as recited in claim 1, wherein the first precipitate comprises thorium oxide.

6. The method as recited in claim 1, further comprising drying the final filtered salt solution after removing the second precipitate to form an actinide-deficient salt.

7. The method as recited in claim 6, further comprising recycling the actinide-deficient salt in a molten salt reactor.

8. The method as recited in claim 1, further including adjusting the pH of the initial filtered salt solution to neutral.

9. The method as recited in claim 1, wherein the second reducing agent includes a diothinite.

10. The method as recited in claim 1, wherein the second precipitate includes uranium oxide.

11. The method as recited in claim 1, wherein the spent salt comprises a carbonate having a carbonate concentration of less than or equal to about 20% by weight.

12. The method as recited in claim 1, further comprising immobilizing the first precipitate in a ceramic pellet.

13. The method as recited in claim 1, wherein the first precipitate includes thorium oxide and the second precipitate comprises uranium oxide.

14. The method as recited in claim 13, further comprising immobilizing the precipitates in a ceramic pellet.

15. The method as recited in claim 1, further comprising immobilizing the second precipitate in a ceramic pellet.

16. A method for removing actinides from a spent salt of a molten salt reactor, comprising:
    dissolving the salt in water to form a salt solution;
    precipitating out the actinides to form a first precipitate by adding a first reducing agent including a metal hydroxide to the salt solution;
    removing the first precipitate from the salt solution to form an initial filtered salt solution;
    adding a second reagent to the initial filtered salt solution after removing the first precipitate to form a second precipitate;
    removing the second precipitate from the initial filtered salt solution to form a final filtered salt solution, wherein the first precipitate includes thorium oxide and the second precipitate includes uranium oxide; and
    passing the final filtered salt solution through an ion exchange column after removing the second precipitate to further remove actinides remaining in the final filtered salt solution.

17. A method for removing actinides from a spent salt of a molten salt reactor, wherein the spent salt contains less than 20% by weight carbonate, comprising the following steps:
    dissolving the salt in water to form a salt solution;
    precipitating out the actinides to form a first precipitate by adding a first reducing agent including a metal hydroxide to the salt solution;
    removing the first precipitate from the salt solution to form an initial filtered salt solution;
    precipitating out a second precipitate of the actinides by adding a second reducing agent to the initial filtered salt solution;
    removing the second precipitate from the initial filtered salt solution to form a final filtered salt solution; and
    passing the final filtered salt solution through an ion exchange column after removing the second precipitate to further remove actinides remaining in the final filtered salt solution.

* * * * *